(12) United States Patent
Hashimoto et al.

(10) Patent No.: US 6,808,846 B2
(45) Date of Patent: Oct. 26, 2004

(54) NEGATIVE ELECTRODE FOR LITHIUM SECONDARY BATTERY AND MANUFACTURING METHOD THEREOF

(75) Inventors: Takuya Hashimoto, Nabari (JP); Atsushi Fukui, Nara (JP); Hiroshi Nakamura, Neyagawa (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 213 days.

(21) Appl. No.: 10/046,697

(22) Filed: Jan. 17, 2002

(65) Prior Publication Data
US 2002/0160265 A1 Oct. 31, 2002

(30) Foreign Application Priority Data
Jan. 17, 2001 (JP) ........................................ 2001-008691

(51) Int. Cl.$^7$ ................................................. H01M 4/62
(52) U.S. Cl. .................... 429/218.1; 429/245; 429/232; 429/231.1
(58) Field of Search .............................. 429/218.1, 245, 429/232, 231.1

(56) References Cited

U.S. PATENT DOCUMENTS 6,051,340 A    4/2000   Kawakami et al. ..... 429/231.95

FOREIGN PATENT DOCUMENTS

| JP | 6-325764    | * 11/1994 |
| JP | 2948205 B   | 7/1999    |
| JP | 2948206 B   | 7/1999    |
| JP | 2000-12088 A | 1/2000   |
| JP | 2000-12089 A | 1/2000   |
| JP | 2000-195502 A | 7/2000  |
| JP | 2001-006682 A | 1/2001  |
| JP | 2001-006682  | * 1/2001 |

* cited by examiner

Primary Examiner—Laura Weiner
(74) Attorney, Agent, or Firm—Kubovcik & Kubovcik

(57) ABSTRACT

A negative electrode for lithium secondary battery characterized in that the electrode is obtained by sintering a mixture of an active material alloy and a binder disposed on a current collector, or a mixture of an active material alloy, conductive metal powder and a binder disposed on a current collector, and the active material alloy after sintered is substantially amorphous.

13 Claims, 1 Drawing Sheet

NEGATIVE ELECTRODE FOR LITHIUM SECONDARY BATTERY AND MANUFACTURING METHOD THEREOF

BACKGROUND OF THE INVENTION

1. Field of the Invention

The present invention relates to a negative electrode for lithium secondary battery and a manufacturing method thereof, and to a lithium secondary battery.

2. Related Art

Conventionally, the following negative electrodes for lithium secondary battery have been proposed in Japanese Patent Publication No. 2948205 and Japanese Patent Laid Open No. 11-339777. The former negative electrode has been manufactured by sintering silicon or silicon/carbon compound applied on a metallic substrate. The latter negative electrode has been manufactured by sintering a complex of silicon and conductive carbon or conductive metal together with a conductive metallic foil. According to the above conventional methods, it is possible to manufacture a negative electrode which is excellent in conductivity due to a reduction of a contact resistance between a sintered body containing an active material and a substrate.

However, an active material containing silicon has an extremely high expansion and shrinkage coefficient by charge and discharge. Further, when charge-discharge cycle is repeated, the active material separates from a current collector, and current collection is reduced, therefore sufficient cycle characteristics can not be obtained.

SUMMARY OF THE INVENTION

An object of the present invention is to provide a negative electrode for lithium secondary battery, which is excellent in charge-discharge cycle characteristics, and a manufacturing method thereof, and to provide a lithium secondary battery.

A negative electrode for lithium secondary battery according to the present invention is an electrode obtained by sintering a mixture of an active material alloy and a binder arranged on a current collector made of metallic foil, or sintering a mixture of the active material alloy, conductive metal powder and a binder arranged on a current collector made of metallic foil, and is characterized in that the active material alloy after sintering is substantially amorphous.

In the negative electrode for lithium secondary battery of the present invention, the active material alloy is sintered; therefore, a binding strength between the active material alloy particles is large. Further, the active material alloy is substantially amorphous; therefore, it is possible to absorb and release lithium without causing a great change of crystal structure during charge and discharge. Accordingly, in the negative electrode for lithium secondary battery of the present invention, the active material particles are hardly pulverized and detached from the current collector when the active material is expanded and shrunk by absorption and release of lithium on charge and discharge. Therefore, it is possible to improve charge-discharge cycle characteristics.

The manufacturing method of a negative electrode for lithium secondary battery of the present invention is characterized in that a mixture of an active material alloy which is substantially amorphous and a binder, or a mixture of the active material alloy, conductive metal powder and a binder is arranged on a current collector, and then sintered under a condition such that the active material alloy after sintering is substantially amorphous.

In the manufacturing method of the present invention, the mixture is sintered under condition such that the active material alloy after sintered is substantially amorphous. More specifically, for example, heat treatment is carried out at a temperature lower than the crystallization temperature of the active material alloy, and thereby, the active material alloy can be sintered in a substantially amorphous state. The crystallization temperature of the active material alloy can be measured by, for example, DSC (differential scanning calorimeter).

Further, it is preferable to carry out heat treatment for sintering in a non-oxidizing atmosphere. The heat treatment in the non-oxidizing atmosphere can be carried out in a vacuum or in an inert gas atmosphere such as argon. Further, the heat treatment can be carried out in a reducing atmosphere such as hydrogen atmosphere. A discharge plasma sintering method and hot press method may be employed as the sintering method.

According to the present invention, in order to arrange the mixture of the active material alloy and the binder, or the mixture of the active material alloy, the conductive metal powder and the binder, on the current collector, the slurry of these mixtures can be applied on the current collector and then dried. More specifically, a slurry is prepared by mixing the active material alloy or the active material alloy and the conductive metal powder with a solution of the binder, and the obtained slurry is applied onto the current collector and then dried.

Further, after application and drying, it is preferable that the mixture layer is rolled together with the current collector before sintering. Because of such rolling, it is possible to improve a packing density of the mixture layer, and to improve an adhesion between active material particles and an adhesion of the active material particles to the current collector.

The negative electrode for the lithium secondary battery of the present invention is not limited to the electrode manufactured by the above manufacturing method of the present invention.

In the present invention, the words "substantially amorphous" means that existence of a halo portion in X-ray diffraction profile is observed, and a degree of non-crystallinity defined by the following equation is 0.3 or more.

Degree of non-crystallinity=maximum peak strength of halo portion profile/maximum peak strength of entire profile FIG. 2 is a diagram to explain the maximum peak strengths of entire profile and halo portion profile in X-ray diffraction profile. As shown in FIG. 2, the maximum peak strength of entire profile is determined from the height of the highest peak of the entire profile from the base line. On the other hand, the maximum peak strength of halo portion is determined from the height of the highest peak of the halo portion from the base line.

In the manufacturing method of the present invention, the active material alloy which is substantially amorphous is used. The substantially amorphous active material alloy is prepared by liquid quenching method, vacuum evaporation method, ion plating method, mechanical alloying method or the like. In these methods, the liquid quenching method is preferable for preparing a large amount of amorphous alloy at a low cost. The liquid quenching method is a rapid solidification method including; single roll and twin roll methods of making an alloy molten and injecting the molten alloy onto a copper roll rotating at high speed; a gas atomization method of spraying the molten alloy using an inert gas; a water atomization method of spraying the molten alloy using water; and a gas-spraying water atomization method of spraying molten alloy using gas and then cooling it using water.

The active material alloy used in the present invention contains preferably Si, further preferably Al, Si and transition metal. The alloy containing Al, Si and transition metal is readily prepared as an amorphous alloy by the above-mentioned liquid quenching method. Examples of the transition metal are chromium, manganese, iron, cobalt, nickel and the like.

Preferably, a metallic foil having a surface roughness Ra of 0.2 μm or more is used as the current collector in the present invention. The surface roughness Ra in the present invention is a value before sintering. The metallic foil having the above surface roughness Ra provides a larger contact area between the active material particles and the surface of the metallic foil, which improves current collection. Further, the larger contact area provides effective sintering and greatly improved adhesion between the current collector and the active material particles. The above surface roughness Ra is determined by Japanese Industrial Standard (JIS B 0601-1994), and is measured by, for example, a surface roughness meter.

The upper limit of the surface roughness Ra of the current collector is not specifically limited, however, preferably 10 μm or less, because the current collector has a thickness of 10 to 100 μm.

As the current collector for the present invention, used is a foil made of metal such as copper, nickel, iron, titanium, or cobalt, or alloy of at least one of these metals. It is particularly preferable that a copper foil is used. As described above, it is preferable that the surface roughness Ra is 0.2 μm or more; therefore, for example, an electrolytic copper foil is preferably used as the copper foil. The electrolytic copper foil is prepared in such a manner that copper is deposited on the surface of copper foil by electrolytic method. Further, other metallic foil having a copper layer formed on the surface by electrolysis may be used.

According to the present invention, as described above, the conductive metal powder is mixed with the active material alloy, if necessary. By mixing the conductive metal powder, a firmly conductive network made of the conductive metal powder can be formed around the active material particles. Therefore, it is possible to improve current collection. The same material as the above current collector may be used as the material of the conductive metal powder. For example, powder made of metal such as copper, nickel, iron, titanium, or cobalt, or alloy of at least one of these metals may be used. In particular, copper or copper alloy powder is preferably used as the conductive metal powder.

Moreover, a mean particle diameter of the active material alloy particle used in the present invention is not specifically limited. However, in order to generate effective sintering, the mean particle diameter is preferably 100 μm or less, and further preferably 50 μm or less, and most preferably 10 μm or less. The mean particle diameter of active material particles is smaller, more excellent cycle characteristics is obtained. Further, a mean particle diameter of the conductive metal powder used in the present invention is not limited. However, it is preferably 100 μm or less, further preferably 50 μm or less, and further preferably 10 μm or less.

In the present invention, a mixing ratio of the conductive metal powder is preferably in a range from 0.05 to 50 parts by weight with respect to 1 part by weight of active material particle. When the mixing ratio of the conductive metal powder is too less, excellent charge-discharge cycle characteristic may not be obtained. On the other hand, when the mixing ratio is too much, the mixing ratio of active material particles is relatively reduced, so that charge-discharge capacity becomes small.

In the present invention, the thickness of the metallic foil is not specifically limited, but preferably falls in the range of 10 μm to 100 μm. Further, the thickness of the sintered body, which is formed by sintering the mixture layer of the active material particles and the conductive metal powder on the metallic foil or sintering the active material particles on the metallic foil, is not specifically limited. However, the thickness of the sintered body is preferably 1000 μm or less, and further preferably 10 μm to 100 μm.

The binder used in the present invention is not specially limited so far as it can be used for the electrode of lithium secondary battery in general. More specifically, a fluorine-containing binder such as poly vinylidene fluoride may be used.

A lithium secondary battery of the present invention comprises the negative electrode of the present invention or the negative electrode manufactured by the method of the present invention, a positive electrode containing positive active material, and non-aqueous electrolyte.

The electrolyte solvent for use in the lithium secondary battery of the present invention is not particularly limited in type but can be exemplified by a mixed solvent which contains cyclic carbonate such as ethylene carbonate, propylene carbonate or butylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and mixtures thereof. Other applicable electrolytes include, for example, a gelled polymer electrolyte comprising an electrolyte solution impregnated into a polymer electrolyte such as polyethylene oxide or polyacrylonitrile and inorganic solid electrolytes such as LiI and $Li_3N$. The electrolyte for the recharageable lithium battery of the present invention can be used without limitation, so long as an Li compound as its solute that imparts an ionic conductivity, as well as its solvent that dissolves and retains the Li compound, remain undecomposed at voltages applied during charge, discharge and storage of the battery.

The positive active material for use in the lithium secondary battery of the present invention is exemplified by lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; lithium-free metal oxides such as $MnO_2$; and the like. Other substances can also be used, without limitation, if they are capable of electrochemical insersion and release of lithium.

DESCRIPTION OF THE PREFERRED EMBODIMENTS

Figure 1:
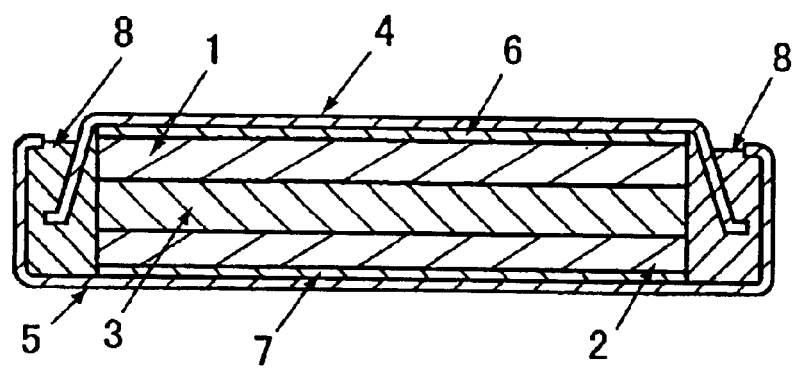
FIG. 1 is a schematic sectional view showing a lithium secondary battery manufactured in one embodiment of the present invention.
Figure 2:
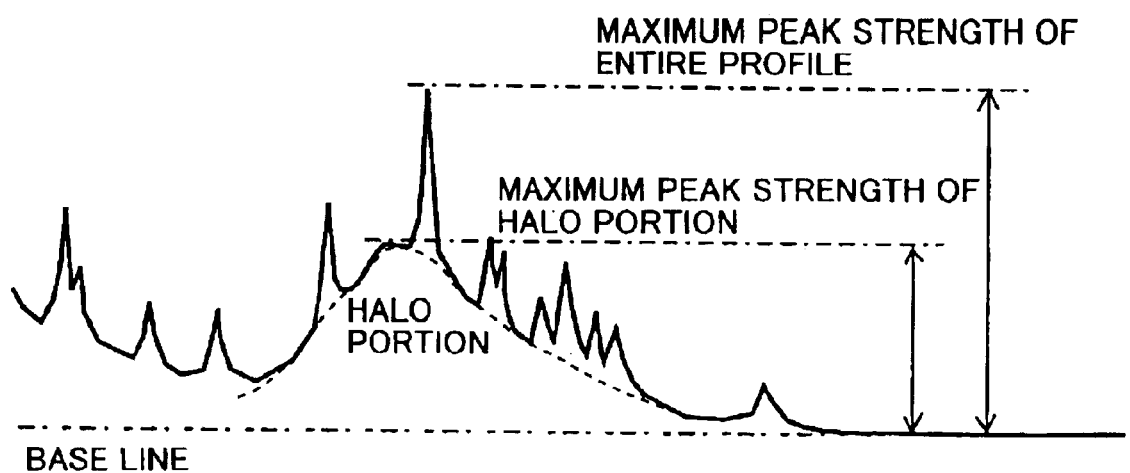
FIG. 2 is a diagram showing an X-ray diffraction profile to explain a degree of non-crystallinity in the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

(Experiment 1)

An alloy foil prepared by single roll quenching method was pulverized to obtain alloy powder having a composition of $Al_{55}Si_{25}Co_{20}$. The alloy powder was used as an active material alloy to manufacture a negative electrode. Further, a lithium secondary battery was manufactured using the obtained negative electrode. Charge-discharge cycle life characteristics of the obtained battery were measured.

[Preparation of Negative Active Material Alloy]

Al, Si and Co reagents having a purity of 99.9% by weight, which were weighed to be an atomic ratio of 55:25:20 respectively, were used as starting materials. These reagents were mixed in a mortar and then pressed to form pressure molding. This molding was melted by arc melting process to prepare an ingot. The ingot was melted, quenched and solidified using a single roll quenching device, and thus, an alloy foil was prepared.

The alloy foil was pulverized in argon atmosphere using a pin mill to have a mean particle diameter of 20 μm. It was confirmed by inductively coupled plasma (ICP) that an atomic ratio (Al:Si:Co) in the composition of the alloy was 55:25:20. Further, the mean particle diameter was measured using a laser diffraction type particle size distribution measuring device, and as a result, the mean particle diameter was 20 μm.

Moreover, a degree of non-crystallinity was measured by powder X-ray diffraction measurement. As a result, it was confirmed that the degree of non-crystallinity was 0.45 and thus the resulting alloy powder was substantially amorphous. Further, DSC measurement was carried out with respect to the resulting alloy powder to measure a temperature of crystallization thereof. As a result, the crystallization temperature was 370° C.

[Preparation of Negative Electrode]

The alloy powder obtained in the above manner and flake-like copper powder having a mean particle diameter of 10 μm were weighed to have a weight ratio of 4:1 and were mixed in a mortar. The mixture of 90 parts by weight was mixed with 8 wt. % N-methyl pyrrolidone solution containing 10 parts by weight of poly vinylidene fluoride as a binder, and thereby, a mixed slurry for negative electrode was prepared. The slurry was applied onto one side of electrolytic copper foil (thickness: 35 μm) having a surface roughness Ra of 0.5 μm, and then, was dried and rolled. The resultant was cut into a shape of circle having a diameter of 20 mm. Further, the resultant was heated at a temperature of 350° C. for 8 hours in the argon atmosphere, and thus, a negative electrode was obtained.

The X-ray diffraction measurement was carried out with respect to the negative electrode after the above heat treatment to measure a degree of non-crystallinity of active material alloy contained in the negative electrode. As a result, the degree of non-crystallinity was 0.45 which is the same as that of a powder state.

[Preparation of Positive Electrode]

A well-known material, $LiCoO_2$ was prepared by baking. The $LiCoO_2$ was pulverized in a mortar so as to have a mean particle diameter of 20 μm and then used as a positive active material. The $LiCoO_2$ powder of 90 parts by weight and artificial graphite powder of 5 parts by weight was mixed with 5 wt. % N-methyl pyrrolidone solution containing 5 parts by weight of poly vinylidene fluoride used as a binder, and thereby, a mixed slurry for positive electrode was prepared. The slurry was applied onto one side of aluminum foil as a current collector, and then, was dried and rolled, and thus, a positive electrode was obtained.

[Preparation of Electrolyte Solution]

An electrolyte solution was prepared by allowing 1 mole/l of $LiPF_6$ to dissolve in a mixed solvent containing ethylene carbonate and diethyl carbonate in proportions by volume of 1:1.

[Manufacture of Battery A1]

A coin type lithium secondary battery A1 was manufactured using the above positive electrode, negative electrode, and electrolyte solution.

FIG. 1 is a sectional view schematically showing a lithium secondary battery thus manufactured. The lithium secondary battery comprises a positive electrode 2, a negative electrode 1, a separator 3, a positive electrode case 5, a negative electrode case 4, a positive current collector 7, a negative current collector 6 and an insulating packing 8 made of polypropylene. A microporous membrane made of polypropylene was used as the separator 3.

As shown in FIG. 1, the negative and positive electrodes 1 and 2 face each other via the separator 3. These negative and positive electrodes 1 and 2 are accommodated in a battery casing defined by the positive electrode case 5 and the negative electrode case 4. The positive electrode 2 is connected to the positive electrode case 5 via the positive current collector 7, while the negative electrode 1 is connected to the negative electrode case 4 via the negative current collector 6, so that the battery is placed in conditions for ready charge and discharge as a rechargeable battery.

[Manufacture of Comparative Batteries B1 to B3]

A negative electrode was manufactured in the same manner as the manufacture of the above battery A1, except that the heat treatment temperature of the negative electrode was changed from 350° C. to 420° C. Then, the battery B1 was manufactured using the obtained negative electrode. The X-ray diffraction measurement was carried out with respect to the negative electrode used for the battery B1 to measure a degree of non-crystallinity of the active material alloy in the electrode. The degree of non-crystallinity was 0.05 which is lower than the value 0.45 of powder state; therefore, it was confirmed that an amorphous state was lost.

Further, alloy powder having the same composition as the above-mentioned negative active material alloy was prepared by arc melting method. The battery B2 was manufacture in the same manner as the above battery A1 except for using the obtained alloy powder. The alloy powder was completely crystalline.

The battery B3 was manufactured in the same manner as the above battery A1 except that the heat treatment of the negative electrode was not carried out.

[Measurement of Charge-Discharge Cycle Life Characteristics]

Charge-discharge cycle life characteristics of the batteries A1 and B1 to B3 were evaluated. Each battery was charged to 4.1V at 25° C. at a current value of 100 μA, and thereafter, was discharged to 2.8V at 25° C. at a current value of 100 μA, and this was determined as one cycle of charge and discharge. In the charge-discharge cycle test, the above charge-discharge cycle was repeated until each battery reaches 80% of the first cycle discharge capacity. The number of cycles at that time was determined as "cycle life". The cycle life of each battery was expressed by a relative index regarding the value of the battery A1 as 100. The test results were shown in the following Table 1.

TABLE 1

| Battery | Heat Treatment Temperature | Degree of Non-crystallinity | Cycle Life |
|---------|---------------------------|----------------------------|------------|
| A1 | 350° C. | 0.45 | 100 |
| B1 | 420° C. | 0.05 | 52 |
| B2 | 350° C. | — | 35 |
| B3 | No heat treatment | 0.45 | 68 |

As apparent from Table 1, the battery A1 using the electrode according to the present invention has excellent charge-discharge cycle characteristics as compared with the comparative batteries B1 to B3.

According to the present invention, it is possible to provide a lithium secondary battery excellent in charge-discharge cycle characteristics.

What is claimed is:

1. A negative electrode for lithium secondary battery, said negative electrode being obtained by sintering a mixture of an active material alloy and a binder arranged on a current collector made of metallic foil, or sintering a mixture of an active material alloy, conductive metal powder and a binder arranged on a current collector made of metallic foil,
   wherein said metallic foil has a surface roughness Ra of 0.2 $\mu$m or more, and
   wherein said active material alloy contains Al, Si and a transition metal and after said sintering process is substantially amorphous such that a halo portion is observed in an X-ray diffraction profile of the alloy and a degree of non-crystallinity of the alloy defined by the following formula is 0.3 or more:
   degree of non-crystallinity=maximum peak strength of halo portion profile/maximum peak strength of entire profile.

2. The negative electrode for lithium secondary battery according to claim 1, wherein said sintering process is performed by heat treatment in a non-oxidizing atmosphere at a temperature lower than the crystallization temperature of said active material alloy.

3. The negative electrode for lithium secondary battery according to claim 1, wherein said metallic foil is an electrolytic copper foil or a metallic foil having an electrolytic copper layer on its surface.

4. The negative electrode for lithium secondary battery according to claim 1, wherein said conductive metal powder is copper or copper alloy powder.

5. A lithium secondary battery comprising; the negative electrode according to claim 1, a positive electrode and a non-aqueous electrolyte.

6. A manufacturing method of a negative electrode for lithium secondary battery, comprising the steps of:
   disposing a mixture of (a) an active material alloy which is substantially amorphous and a binder, or a mixture of said active material alloy, conductive metal powder and a binder, said active material alloy containing Al, Si and a transition metal, on a current collector made of metallic foil; and
   sintering said mixture under a condition such that said active material alloy after said sintering is substantially amorphous such that a halo portion is observed in an X-ray diffraction profile of the alloy and a degree of non-crystallinity of the alloy defined by the following formula is 0.3 or more:
   degree of non-crystallinity=maximum peak strength of halo portion profile/maximum peak strength of entire profile.

7. The manufacturing method of a negative electrode for lithium secondary battery according to claim 6, wherein said sintering is performed by heat treatment in a non-oxidizing atmosphere at a temperature lower than the crystallization temperature of said active material alloy.

8. The manufacturing method of a negative electrode for lithium secondary battery according to claim 6, wherein said active material alloy, or said active material alloy and said conductive metal powder are mixed with a solution of said binder to obtain slurry, and the obtained slurry is applied onto said current collector and then dried, and thereby, said mixture is disposed on the current collector.

9. The manufacturing method of a negative electrode for lithium secondary battery according to claim 8, wherein said mixture is rolled together with said current collector after said application and drying process.

10. The manufacturing method of a negative electrode for lithium secondary battery according to claim 6, wherein said metallic foil has a surface roughness Ra of 0.2 $\mu$m or more.

11. A lithium secondary battery comprising; the negative electrode manufactured by the method according to claim 10, a positive electrode and a non-aqueous electrolyte.

12. The manufacturing method of a negative electrode for lithium secondary battery according to claim 6, wherein said metallic foil is an electrolytic copper foil or a metallic foil having an electrolytic copper layer on its surface.

13. The manufacturing method of a negative electrode for lithium secondary battery according to claim 6, wherein said conductive metal powder is copper or copper alloy powder.

* * * * *